DEWITT & BARRETT.
Rotary Harrow.
No. 19,494.
Patented Mar. 2, 1858.
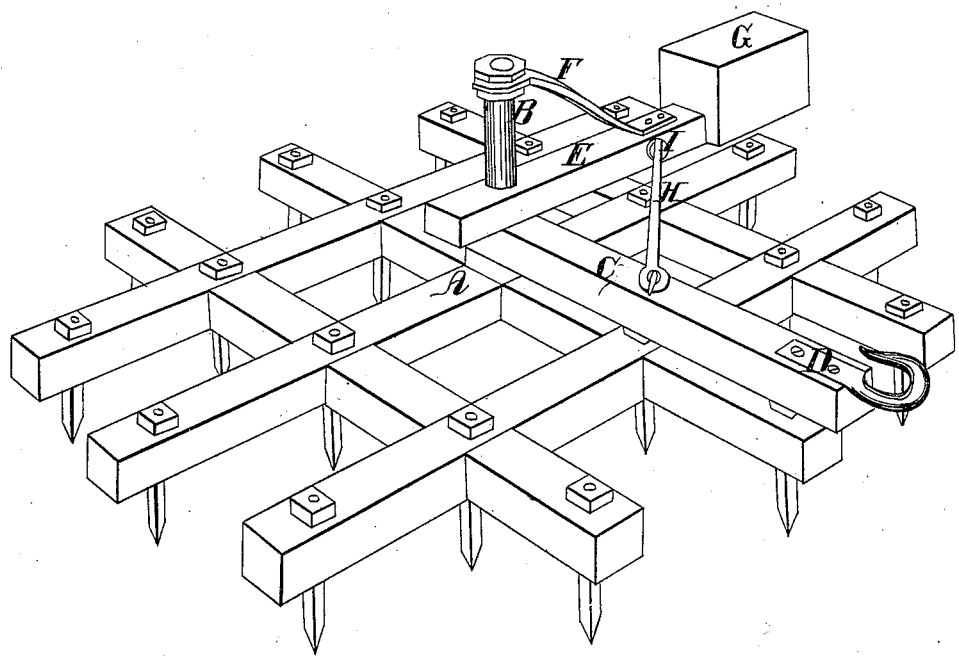

UNITED STATES PATENT OFFICE.

W. DE WITT AND O. D. BARRETT, OF CLEVELAND, OHIO.

IMPROVEMENT IN HARROWS.

Specification forming part of Letters Patent No. 19,494, dated March 2, 1858.

*To all whom it may concern:*

Be it known that we, WILLIAM DE WITT, of Cleveland, in the county of Cuyahoga and State of Ohio, and O. D. BARRETT, of the city, county, and State aforesaid, have invented a new and useful Improvement on Rotary Harrows; and we hereby declare that the following is a full, clear, and exact description of the same, reference being had to the annexed drawing, a perspective view of the same, forming a part of this specification.

The frame of the harrow A is made of six pieces of timber of suitable size, halved together and fastened by the harrow-teeth, having shoulders, screws, and nuts. The teeth in the ends of the timbers are placed in nearly equal distances from each other, but at unequal distances from the center, thus securing more than one row of teeth of those in the ends of the timbers.

In the center of the harrow is the center pin, B, fastened perpendicular to the frame of the harrow A by means of a screw cut on its lower end and two nuts—one above and the other below the frame.

On the center B, and movable around it horizontally, is the draft-bar C, to which the team is attached by the hook D. Above the draft-bar C, and movable like it around the center pin, B, is the weighted arm E, kept in its position perpendicular to the center pin, B, by the brace F, attached as represented, and held at right angles to the draft-bar C on either side by the connecting-rod H.

The connecting-rod H is hinged on the draft-bar E, as represented, and hooks into the staple I, driven into the weighted arm E, or into a staple opposite I, (not represented in the drawing,) when the weighted arm E is turned to the other side of the draft-bar C.

The weight, G, for a five-foot harrow should be about thirty-five pounds. This weight, by its action on the teeth on whichever side it is placed, causes them to meet with more resistance as the harrow is drawn forward than those on the opposite side, and thus a rotary motion horizontally is given to the harrow.

We are aware that the use of a weighted roller or its equivalent upon the periphery of a circular harrow was patented by S. S. Hogle March last. We do not claim the use of a weighted roller or its equivalent as specified by him; but What we do claim as our invention, and desire to secure by Letters Patent, is—

The arrrangement of center pin, B, draft-bar C, arm E, and weight G, with harrow A, in the manner and for the purpose herein described.

W. DE WITT.
O. D. BARRETT.

In presence of—
A. SPARROWHAWK,
JAMES FITZSIMMONS.